(12) United States Patent
Shaw

(10) Patent No.: US 6,367,886 B1
(45) Date of Patent: Apr. 9, 2002

(54) BRAKE PEDAL EMULATOR SYSTEM AND METHOD

(75) Inventor: Schuyler S. Shaw, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/772,588

(22) Filed: Jan. 30, 2001

Related U.S. Application Data
(60) Provisional application No. 60/221,283, filed on Jul. 27, 2000.

(51) Int. Cl.[7] ............................ B60T 7/04; B60T 8/00
(52) U.S. Cl. ......................... 303/3; 303/20; 303/50; 303/155; 303/115.2; 188/151 A; 188/158
(58) Field of Search .......................... 303/3, 20, 155, 303/152, 113.4, 115.2, 113.1, 50; 60/545, 550, 554; 188/151 A, 156, 158; 701/70, 83, 76; 74/512, 560, 514

(56) References Cited

U.S. PATENT DOCUMENTS 6,014,862 A * 1/2000 Shaw et al.
6,105,737 A * 8/2000 Weigert et al. ................. 303/3
6,183,050 B1 * 2/2001 Genzel ......................... 303/50
6,233,932 B1 * 5/2001 Heibel et al.
6,298,746 B1 * 10/2001 Shaw ........................... 74/512
2001/0002768 A1 * 6/2001 Mohr ....................... 303/113.1
2001/0043009 A1 * 11/2001 Anderson et al. ............... 303/3

FOREIGN PATENT DOCUMENTS

| EP | 0 708 006 A1 | 4/1996 |
|----|---|---|
| EP | 0 708 006 B1 | 3/2000 |
| JP | 280872 | * 10/2000 |
| WO | 0140038 | * 6/2001 |

* cited by examiner

Primary Examiner—Douglas C. Butler
(74) Attorney, Agent, or Firm—Scott A. McBain

(57) ABSTRACT

A brake pedal emulator that produces a pedal characteristic not unlike conventional vacuum or hydraulic brake systems. The system includes an emulator housing, a damper positioned within the emulator housing, a shaft that is slidably received by the emulator housing, and a sequential spring system within the emulator housing in operable contact with the shaft. When a brake pedal force is manually applied, the sequential spring system compresses thereby providing a spring force, which in conjunction with the dynamic dampening force produced by the damper generates the desirable reaction force.

21 Claims, 4 Drawing Sheets

BRAKE PEDAL EMULATOR SYSTEM AND METHOD

RELATED APPLICATIONS

This application claims the benefit of U.S. Provisional Application No. 60/221,283, filed Jul. 27, 2000.

TECHNICAL FIELD OF THE INVENTION

The present invention relates to a "dry" brake pedal system. One aspect of the invention relates to a device that emulates a conventional vacuum or hydraulic brake pedal system wherein a non-linear brake pedal travel versus brake pedal force characteristic is achieved with simultaneous dynamic dampening.

BACKGROUND OF THE INVENTION

Vehicle drivers have become accustomed to the "feel" of a brake pedal resistance that mirrors a manually applied braking force. Braking systems commonly known as brake-by-wire (BBW) or similar systems typically include a master cylinder that is isolated from the braking system. Such BBW systems rely on automatic electric or electric-hydraulic means to remotely activate the brake. Consequently, brake pedal "feel" can be different to that during a manual application of the braking force. This has provided an impetus to develop a brake pedal actuator that has the "feel" of a resistance force coacting against the driver in a manner normally provided by manual apply systems.

The limited space under an automobile instrument panel calls for a compact brake system. Hydraulic fluid braking systems are compact, but are costly and can be prone to failure due to temperature sensitivity and need for efficient sealing. Alternatively, "dry" BBW systems do not require pressurized hydraulic fluid, but are generally bulky due to the need for additional components to emulate "feel". For example, external dampers are useful for emulating "feel", but also increase unit size. Current innovations have lead to either increased unit cost or a discernable difference in the brake pedal "feel" characteristic during brake application.

Therefore, it would be desirable to achieve a "dry" BBW system that is reliable, compact, relatively inexpensive to manufacture, and capable of emulating the "feel" of a conventional vacuum or hydraulic brake pedal system.

SUMMARY OF THE INVENTION

One aspect of the invention provides a brake pedal emulator system comprising an emulator housing, a damper positioned within and operably attached to the emulator housing, a shaft that is slidably received within the emulator housing, and a sequential spring system positioned within the emulator housing and in operable contact with the shaft. The shaft compresses the sequential spring system while the damper exerts a dynamic dampening force against the movement of the shaft. The shaft is comprised of a clevis, a damper housing, and a shaft bar that is attached at a first end to said clevis and at a second end to said damper housing. The damper is comprised of: a damper rod that is positioned within and retained by the emulator housing, a damper piston that is attached to a first end of said damper rod, and a damper housing which is attached at a first end to the shaft bar, terminates at a second end into a shoulder structure, and encompasses the damper rod. An orifice is formed between the damper piston and the damper housing that allows a fluid to flow from a damper reservoir to a variable chamber. This embodiment of the invention further provides for the sequential spring system to be comprised of a plurality of springs wherein said springs are each fabricated of steel coil. Furthermore, the plurality of springs is comprised of a first, second, third, and fourth spring positioned within the emulator housing. The first spring is positioned between a first end of the emulator housing and a flange portion of the shaft, the second spring is positioned between the shoulder structure of the damper housing and a floating washer, the third spring is position between said washer and a septum portion of the emulator housing, and the fourth spring is positioned coaxially with the third spring. The first, third, and fourth springs are positioned coaxially with respect to the shaft. Finally, a force transducer and a travel transducer are positioned within the emulator housing and operably attached to the shaft in order to measure brake pedal force and shaft travel, respectively.

Another aspect of the invention provides for an application of a brake pedal force which results in transmission of said force to a shaft that is slidably received by an emulator housing. A plurality of springs positioned with the emulator housing is sequentially compressed while a dampening member positioned within said emulator housing generates a dynamic dampening force against the shaft. Internally positioned transducers measure brake pedal force and shaft travel and output signals proportional to said force and said travel are relayed to activate a brake. During operation, a reaction force is generated by the brake pedal emulator system at a brake pedal that is operably attached to the shaft. The reaction force is comprised of a combination of the dampening force and a spring force wherein the spring force increases with a sequential compression of the plurality of springs. The sequential compression of springs is comprised of a serial and a parallel compression of two or more springs. Furthermore, an order of the sequential compression of the plurality of springs is determined by a free travel distance of each spring.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION THE DRAWINGS

DETAILED DESCRIPTION OF THE PRESENTLY PREFERRED EMBODIMENTS

One aspect of the invention simulates the "feel" of a conventional vacuum or hydraulic brake pedal system wherein a non-linear brake pedal travel versus brake pedal force characteristic is achieved with simultaneous dynamic dampening. Another aspect of the invention provides a compact structure due to a coaxial internal arrangement of springs around a central damper rod and internal placement of sensor(s). This aspect can further provide for a system that is cost effective and relatively simple to manufacture, as compared to a conventional hydraulic systems.

Figure 1:
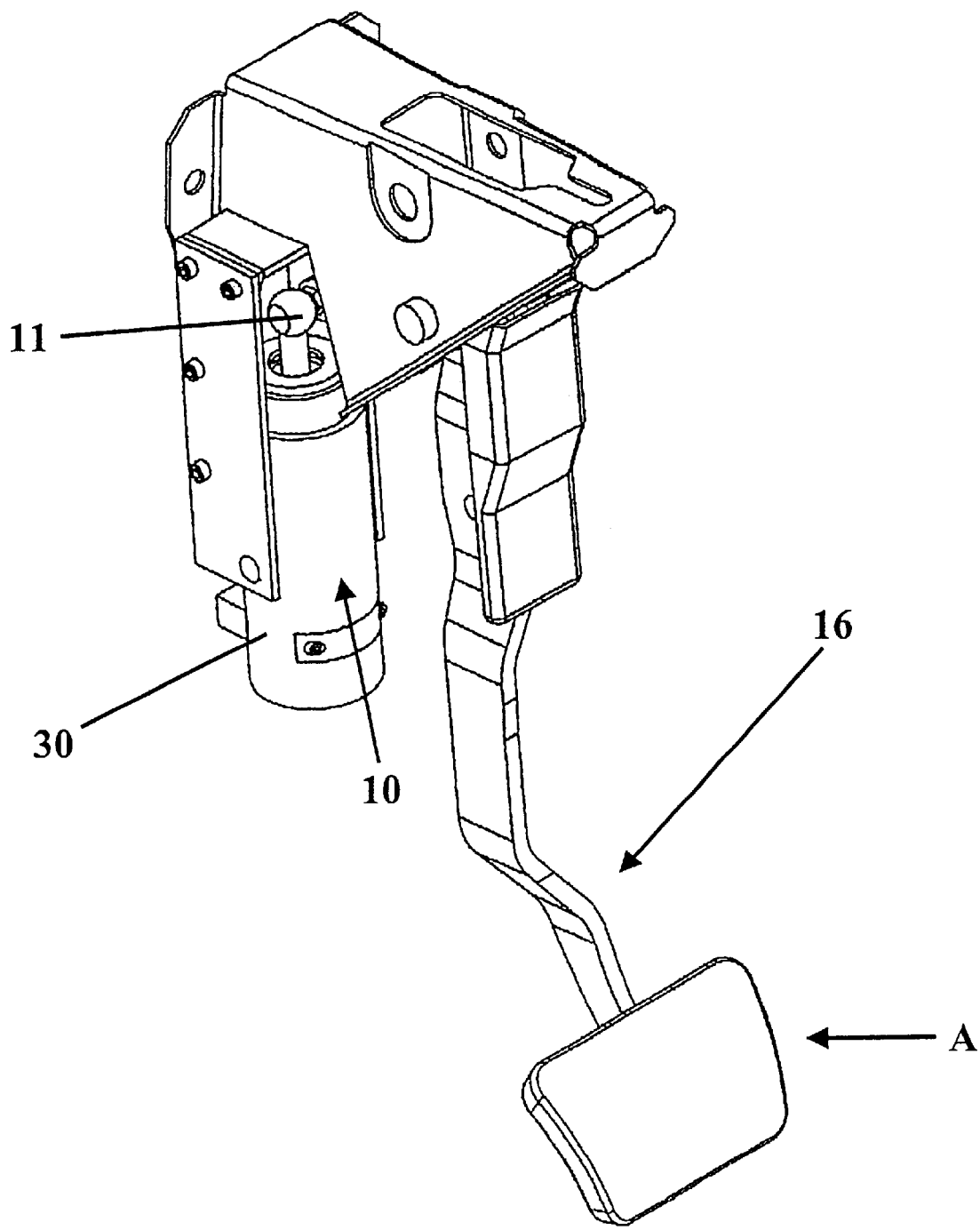
FIG. 1 is a perspective view of a brake pedal operably attached to one embodiment of a pedal emulator system.

FIG. 1 shows a perspective view of a brake pedal operably attached to one embodiment of a brake pedal emulator system 10. Referring to FIG. 1, a brake pedal 16 is operably attached to the brake pedal emulator system 10 at the point of a clevis 11. The system 10 is largely housed within housing 30. The brake pedal emulator system 10 is responsive to a brake pedal force A manually applied to the brake pedal 16.

Figure 2:
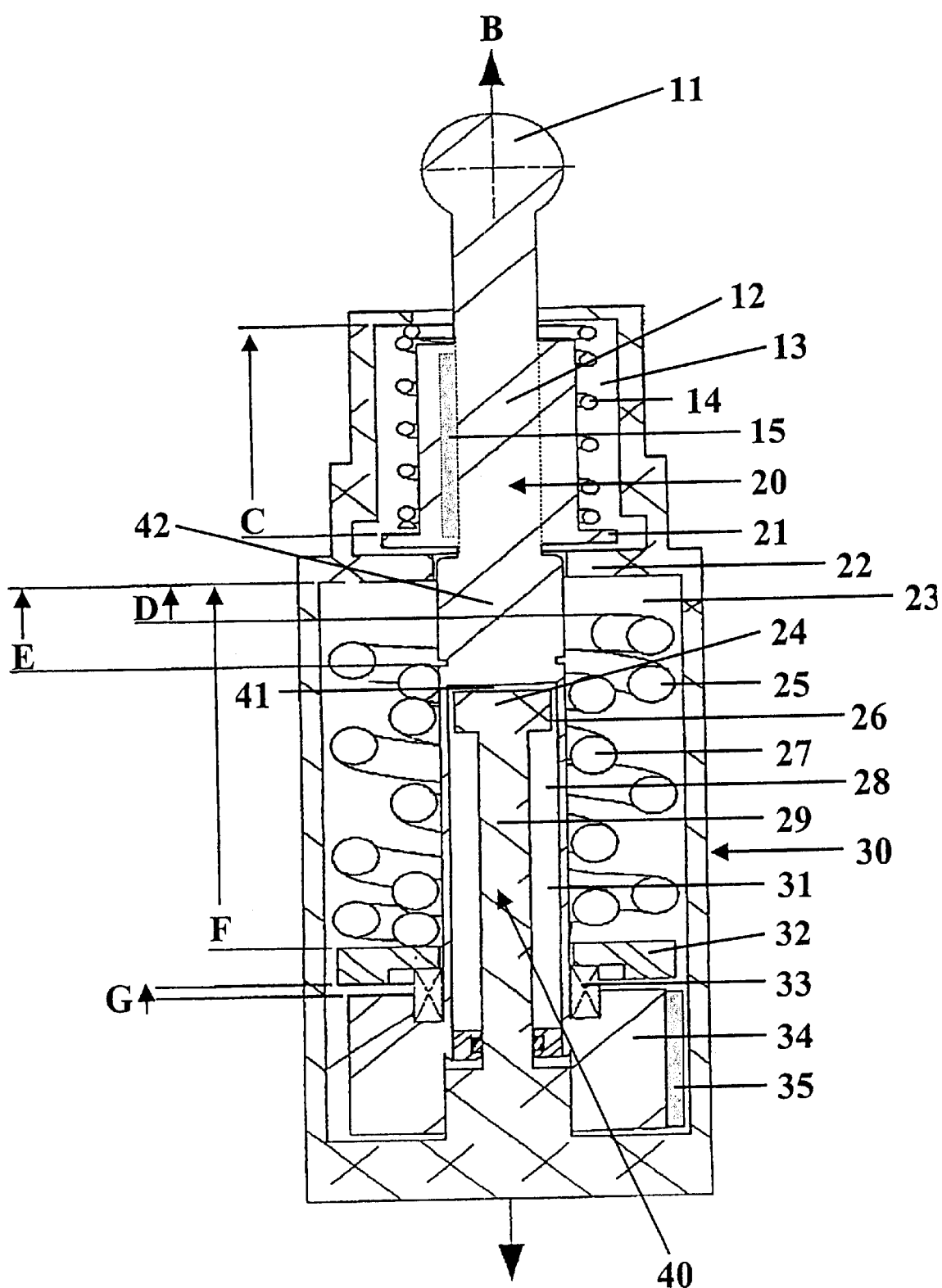
FIG. 2 is a fragmentary cross-sectional view of the system of FIG. 1.

FIG. 2 shows a fragmentary cross-sectional view of the brake pedal emulator system 10 depicted in FIG. 1. Consistent with FIG. 2, a cylindrically shaped emulator housing 30 receives a shaft 20 that is comprised of a clevis 11, a shaft bar 12 (shown in phantom), and a damper housing 42. A septum 22 divides the emulator housing into a first chamber 13 and a second chamber 23. The shaft bar 12 is attached at a first end to the clevis 11, and at a second end to the damper housing 42. The damper housing 42 terminates at a second end into two shoulder structures 34. A damper rod 29 and a damper piston 24 are received by the damper housing 42. The aforementioned parts 20, 24, 29, 30 and their components are manufactured from a solid steel alloy.

The shaft 20 compresses a sequential spring system comprised of a plurality of springs 14, 25, 27, 33 during the application of a brake pedal force A. In the embodiment shown in FIG. 2, the spring system is comprised of a first spring 14, a second spring 33, a third spring 25, and a fourth spring 27 each of steel coil construction. The sequential spring system may alternatively comprise any plurality of biasing members to achieve a desired spring force characteristic. Each of the springs 14, 25, 27, 33 is positioned within the emulator housing 30 and in operable contact with the shaft 20. The first spring 14 is positioned in the first chamber 13 while a floating washer 32, second spring 33, third spring 25, and fourth spring 27 are position within the second chamber 23. The first spring 14, is positioned between a first end of the emulator housing 30 and a flange portion 21 of the shaft 20. The second spring 33 is held between the shoulder structures 34 of the damper housing 42 and the washer 32. The third spring 25 is positioned between the washer 32 and the septum 22 of the emulator housing 30. Finally, the fourth spring 27 is positioned coaxially within the third spring 25. The four springs 14, 25, 27, 33 are placed in a coaxial arrangement within the two chambers 13, 23 of the emulator housing 30 and with respect to the shaft 20.

In the embodiment shown in FIG. 2, a damper 40 provides a dynamic dampening force against the shaft 20 during the application of a brake pedal force A. The damper 40 is positioned within and operably attached to the emulator housing 30 and is comprised of the damper rod 29 attached to a first end of the damper piston 24 and the damper housing 42. The emulator housing 30 is functionally attached to and retains the damper rod 29. The damper 40 contains a fluid 31 that moves between a reservoir 28 and a variable chamber 41 through an orifice 26 formed between the damper piston 24 and the damper housing 42.

A force transducer 15 is positioned in the first chamber 13 and operably attached to the shaft bar 12 whereby the transducer measures the brake pedal force A. A travel transducer 35 is positioned in the second chamber 23 and operably attached to the emulator housing 30 whereby the transducer measures a travel of the shaft 20.

Figure 3:
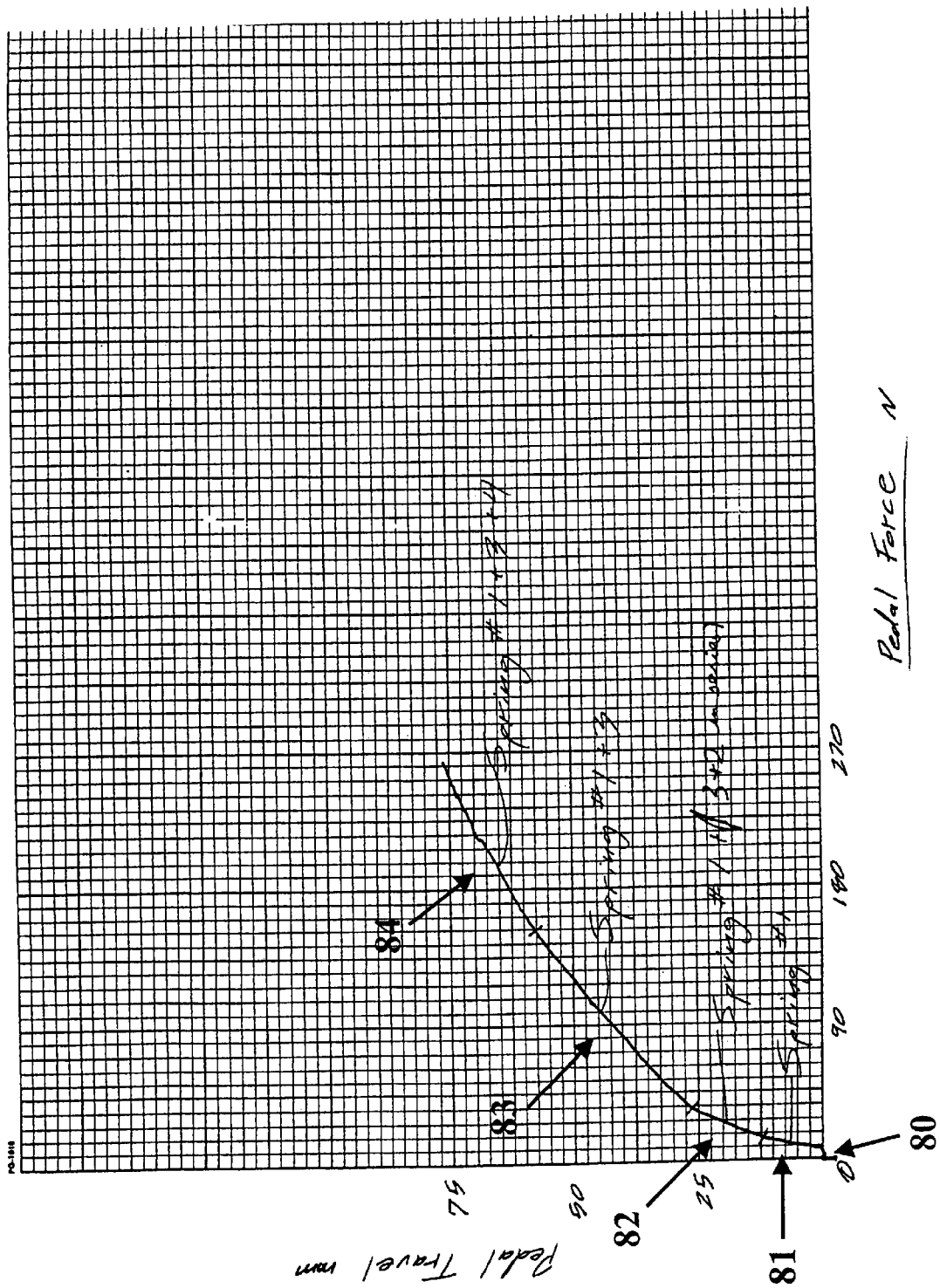
FIG. 3 is a graph of brake pedal force versus brake pedal travel for the system of FIG. 1

During operation of the embodiment depicted in FIG. 2, a force applied to the brake pedal 16 produces an axial force B that translates into a movement of the shaft 20 out of the emulator housing 30 in the direction noted by the arrow B. The movement of the shaft 20 results in a sequential compression of the plurality of springs 14, 25, 27, 33 wherein an increasing spring force is generated. A free travel distance of each spring 14, 25, 27, 33 determines an order of the sequential compression. For example, when a spring is without free travel, it begins to compress. Initially, when zero brake pedal force A is applied, the first spring 14 is under a pre-load and without free travel. The first spring 14 produces a measurable initial pedal response curve 80, (FIG. 3) wherein no brake pedal travel occurs until the brake pedal force A overcomes the pre-load force. Once the brake pedal force A exceeds the pre-load of the first spring 14, the shaft 20 begins to move out of the emulator housing 30. The shaft 20 continues to compress the first spring 14, shown by an arrow C, generating a characteristic pedal response curve 81. As the shaft 20 continues to move out of the emulator housing 30, the floating washer 32 and the springs 25, 27, 33 positioned in the second chamber 23 move toward the septum 22 dissipating the free travel of the third spring D. An arrow F depicts the movement of the springs 25, 27, 33, shaft 20, and washer 32. Once the third spring 25 contacts the septum 22, it begins to compress in series with the second spring 33. The two aforementioned springs 25, 33 simultaneously compress in parallel with the first spring 14 generating a characteristic pedal response curve 82. The free travel of the second spring G is consumed upon which the shoulder structures 34 of the damper housing 42 contact the washer 32. At this point, the second spring 33 terminates compression. The first spring 14 continues to compress along with the third spring 25 in parallel generating a characteristic pedal response curve 83. Finally, the shaft 20 continues to move out of the emulator housing 30 dissipating the free travel of the fourth spring E. The fourth spring 27 then contacts the septum 22 and begins to compress in parallel with the first spring 14 and third spring 25. A characteristic pedal response is generated 84. The sequential compression of the plurality of springs 14, 25, 27, 33 produces an increasing spring force which in turn increases the brake pedal reaction force. As the brake pedal reaction force increases, the rate of the brake pedal travel versus the brake pedal force A is diminished.

During the aforementioned sequential compression of the plurality of springs 14, 25, 27, 33, the force transducer 15 and travel transducer 35 monitor both brake pedal force A and travel of the shaft. The transducers relay this information to activate a brake. In addition, the damper 40 produces an independent dynamic dampening force against the shaft 20 that is commensurate with the brake pedal force A and additive to the spring force produced by the sequential compression of the plurality of springs 14, 25, 27, 33. The orifice 26 formed between the damper piston 24 and damper housing 42 determines the dampening characteristic wherein the movement of the fluid 31 is restricted between the reservoir 28 and the variable chamber 41. In the preferred embodiment, the overall reaction force generated at the brake pedal 16 is a combination of the dampening and the spring force and is similar to that produced by a vacuum or pressurized hydraulic brake pedal system.

The present invention allows for variations that permit customization in different brake applications. For example, springs with different spring constants can be utilized in order to achieve a desirable spring force characteristic. Alternatively, any number or type of springs, elastomeric springs, metallic alloy, other biasing members or the like may be used to achieve the desired characteristic. The orifice 26 can be sized to adjust the dynamic dampening force characteristic produced by the damper 40. The system may include a force transducer 15 to measure brake pedal force. The system may alternately include a travel transducer 35 to measure travel of the shaft. In one embodiment, the system includes a force transducer 15 and a travel transducer 35. The placement and differential use of the transducers 15, 35 allows for variations in system packaging and pedal response curves 80–84. Additionally, the brake pedal arm 16 can be oriented so as to produce an axial force B that serves to compress instead of extend the brake pedal emulator system FIG. 4.

Figure 4:
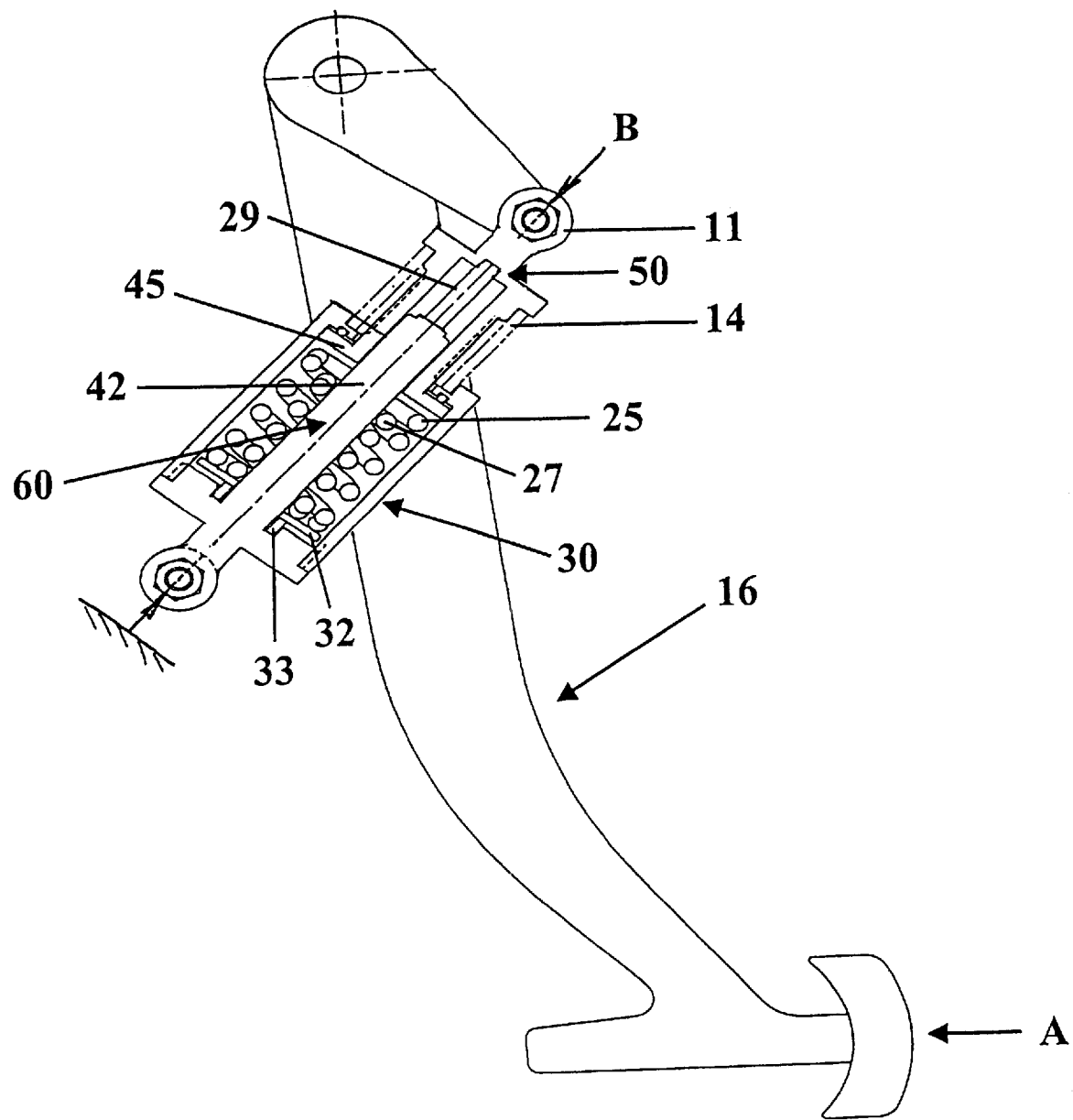
FIG. 4 is a fragmentary cross-sectional view of another embodiment of the system in FIG. 1.

The alternative embodiment depicted in FIG. 4 produces a pedal response curve similar to the embodiment of FIG. 2. Some aspects of the alternative embodiment are: a modified shaft 50 comprised of a shaft piston 45 that is attached to the clevis 11 wherein said shaft piston 45 operably compresses the plurality of springs 14, 25, 27, 33, a modified damper 60 attached to the clevis 11 through the damper rod 29 wherein the damper housing 42 does not functionally compress any member of the plurality of springs 14, 25, 27, 33, and movement of the shaft 50 into the emulator housing 30. A brake pedal force A applied to the system produces an axial force B that translates into a movement of the shaft 50 into the emulator housing 30. The shaft 50 compresses the sequential spring system 14, 25, 27, 33 during brake pedal 16 application. Consistent with the embodiment depicted in FIG. 2, the compression of the springs 14, 25, 27, 33 in the alternative embodiment produces a characteristic spring force characteristic while the damper 60 provides a simultaneous dynamic dampening force. The spring force and the dampening force produce a characteristic pedal response curve wherein a non-linear brake pedal travel versus brake pedal force characteristic with simultaneous dynamic dampening is achieved.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A brake pedal emulator system comprising:
   an emulator housing;
   a damper positioned within and operably attached to the emulator housing;
   a shaft that is slidably received within the emulator housing; and
   a sequential spring system positioned within the emulator housing and in operable contact with the shaft wherein the shaft compresses said sequential spring system while the damper exerts a dynamic dampening force against a movement of the shaft.

2. The system of claim 1 wherein the shaft comprises:
   a clevis;
   a damper housing; and
   a shaft bar attached at a first end to the clevis and attached at a second end to the damper housing.

3. The system of claim 1 wherein the damper comprises;
   a damper rod that is positioned within and retained by the emulator housing;
   a damper piston that is attached to a first end of said damper rod; and
   a damper housing which is attached at a first end to the shaft bar, terminates at a second end into a shoulder structure, and encompasses the damper rod and the damper piston wherein an orifice is formed between the damper piston and said damper housing that allows a fluid to flow from a damper reservoir to a variable chamber.

4. The system of claim 1 wherein the sequential spring system comprises a plurality of springs fabricated of steel coil.

5. The system of claim 4 wherein the plurality of springs comprises a first, second, third, and fourth springs positioned within the emulator housing wherein said first, third, and fourth springs are positioned coaxially with respect to the shaft.

6. The system of claim 5 wherein the first spring is positioned between a first end of the emulator housing and a flange portion of the shaft, the second spring positioned between the shoulder structure of the damper housing and a washer, the third spring position between the washer and a septum portion of the emulator housing, and the fourth spring positioned coaxially with the third spring.

7. The system of claim 1 further comprising;
   a force transducer positioned within the emulator housing and operably attached to the shaft wherein said force transducer measures a brake pedal force; and
   a travel transducer positioned within the emulator housing and operably attached to the shaft wherein said travel transducer measures a travel of the shaft.

8. A method of operating a brake pedal emulator system comprising:
   applying a brake pedal force results in transmission of said force to a shaft slidably received by an emulator housing;
   sequentially compressing a plurality of springs within the emulator housing; and
   generating a dynamic dampening force from a dampening member positioned within the emulator housing against the shaft while the plurality of springs are being sequentially compressed.

9. The method of claim 8 further comprising;
   sensing the brake pedal force applied to the system within the emulator housing; and
   sending an output signal proportional to said brake pedal force to activate a brake.

10. The method of claim 8 further comprising;
    sensing a travel of the shaft within the emulator housing; and
    sending an output signal proportional to the travel to activate a brake.

11. The method of claim 8 wherein a reaction force is generated by the brake pedal emulator system at a brake pedal operably attached to a shaft.

12. The method of claim 11 wherein the reaction force comprises a combination of the dampening force and a spring force.

13. The method of claim 12 wherein the spring force increases with a sequential compression of the plurality of springs.

14. The method of claim 13 wherein the sequential compression of springs comprise a serial compression of two or more members of the plurality of springs.

15. The method of claim 13 wherein the sequential compression of springs comprise a parallel compression of two or more members of the plurality of springs.

16. The method of claim 8 wherein a free travel distance of each spring determines an order of the sequential compression of the plurality of springs.

17. A brake pedal emulator system comprising;

means for applying a brake pedal force that results in transmission of said force to a shaft slidably received by an emulator housing;

means for sequentially compressing a plurality of springs within the emulator housing; and means for generating a dynamic dampening force from a dampening member positioned within the emulator housing against the shaft while the plurality of springs are being sequentially compressed.

18. The system of claim 17 further comprising;

means for sensing an axial force applied to the system within the emulator housing; and means for sending an output signal proportional to an axial force to activate a brake.

19. The system of claim 17 further comprising;

means for sensing a travel of the shaft within the emulator housing; and means for sending an output signal proportional to the travel of the shaft to activate a brake.

20. The system of claim 17 wherein applying a brake pedal force results in a compression force and movement of the shaft into the emulator housing further comprising;

means for sequentially compressing a plurality of springs within the emulator housing; and means for applying a dynamic dampening force from a dampening member positioned within the emulator housing against the shaft while the plurality of springs are being sequentially compressed.

21. The system of claim 17 wherein applying a brake pedal force results in a tensile force and movement of the shaft out of the emulator housing further comprising;

means for sequentially compressing a plurality of springs within the emulator housing; and means for applying a dynamic dampening force from a dampening member positioned within the emulator housing against the shaft while the plurality of springs are being sequentially compressed.

* * * * *